(12) United States Patent
Kim

(10) Patent No.: US 11,636,452 B2
(45) Date of Patent: Apr. 25, 2023

(54) METHOD AND SYSTEM FOR SPLIT PAYMENT

(71) Applicant: LINE Plus Corporation, Seongnam-si (KR)

(72) Inventor: Seonkyung Kim, Seongnam-si (KR)

(73) Assignee: LINE Plus Corporation, Seongnam-Si (KR)

( * ) Notice: Subject to any disclaimer, the term of this patent is extended or adjusted under 35 U.S.C. 154(b) by 82 days.

(21) Appl. No.: 17/011,137

(22) Filed: Sep. 3, 2020

(65) Prior Publication Data

US 2021/0097511 A1 Apr. 1, 2021

(30) Foreign Application Priority Data

Sep. 26, 2019 (KR) ........................ 10-2019-0119023

(51) Int. Cl.
| | |
|---|---|
| *G06Q 20/10* | (2012.01) |
| *G06Q 10/10* | (2012.01) |
| *G06Q 20/04* | (2012.01) |
| *G06Q 20/08* | (2012.01) |
| *G06Q 30/04* | (2012.01) |
| *G06Q 50/00* | (2012.01) |
| *G06V 10/10* | (2022.01) |
| *G06V 30/416* | (2022.01) |

(52) U.S. Cl.
CPC .......... *G06Q 20/102* (2013.01); *G06Q 10/10* (2013.01); *G06Q 20/047* (2020.05); *G06Q 20/085* (2013.01); *G06Q 30/04* (2013.01); *G06Q 50/01* (2013.01); *G06V 10/17* (2022.01); *G06V 30/416* (2022.01)

(58) Field of Classification Search
None
See application file for complete search history.

(56) References Cited

U.S. PATENT DOCUMENTS

| | | | | |
|---|---|---|---|---|
| 11,238,429 | B2* | 2/2022 | Cohn | G06Q 20/405 |
| 2013/0238455 | A1* | 9/2013 | Laracey | G06Q 20/102 |
| | | | | 705/21 |
| 2014/0156508 | A1* | 6/2014 | Argue | G06Q 20/326 |
| | | | | 705/35 |
| 2014/0164234 | A1* | 6/2014 | Coffman | G06Q 30/04 |
| | | | | 705/40 |
| 2017/0372282 | A1* | 12/2017 | Sarin | G06Q 20/102 |
| 2020/0097935 | A1* | 3/2020 | Takahashi | G06Q 20/223 |
| 2020/0226561 | A1* | 7/2020 | Inagawa | G06Q 20/42 |

(Continued)

FOREIGN PATENT DOCUMENTS

KR 10-2012-0111095 A 10/2012

*Primary Examiner* — Christopher Bridges
*Assistant Examiner* — Tony P Kanaan
(74) *Attorney, Agent, or Firm* — Sughrue Mion, PLLC

(57) ABSTRACT

A method and a computer system for a split payment are provided. A split payment method may include: obtaining cost information of at least one transaction for a split payment; creating a split payment page that allows a visitor of the split payment page to pay a portion of a cost of the at least one transaction; providing the visitor with a link to the split payment page; and based on the portion of the cost of the at least one transaction being selected by the visitor of the split payment page, processing a payment or remittance of the portion of the cost, and updating the split payment page according to a result of the payment or the remittance.

17 Claims, 8 Drawing Sheets

(56) References Cited

U.S. PATENT DOCUMENTS

2020/0328907 A1* 10/2020 Kim .................... H04L 12/1818
2021/0019716 A1*  1/2021 Prokop ............ G06Q 20/38215
2021/0248584 A1*  8/2021 O'Toole ............... G06Q 20/223

* cited by examiner

METHOD AND SYSTEM FOR SPLIT PAYMENT

CROSS-REFERENCE TO RELATED APPLICATION

This application claims priority from Korean Patent Application No. 10-2019-0119023, filed Sep. 26, 2019 in the Korean Intellectual Property Office, the disclosure of which is incorporated herein by reference in its entirety.

BACKGROUND

1. Field

Apparatuses and methods according to example embodiments relate to enabling a group of people to split payments.

2. Description of Related Art

A plurality of users may need to divide, that is, split and process a payment. For example, when several people eat together in a restaurant, they may want to split the payment in various methods including, for example, a method of splitting the entire cost evenly and each person individually pays the restaurant his/her portion of the cost, a method of allowing one of the people to pay the restaurant the entire cost and then allowing the payer to receive a certain amount of money from the non-payers. A split payment providing system in the related art includes a recognizer configured to support near field wireless communication with a portable terminal embedded with at least one payment device and capable of making a mobile payment and, in response to a request for a split payment from a payer group including a plurality of payers for a payment amount set by a seller, to recognize payment information associated with a payment device embedded in a portable terminal through near field wireless communication with the portable terminal held by a corresponding payer for each of payers included in the payer group and a payment processor configured to set a split amount for each payer by splitting the payment amount for the payer group and to process a payment for the split amount based on payment information of each payer.

SUMMARY

Example embodiments provide a split payment method and system that may recognize cost information for each payment item based on a bill or a receipt related to cost for split payment, and may create and provide a link to a split payment page that allows a selection on a payment item and supports a payment or remittance of cost for the selected payment item based on the cost information for each payment item, such that each of users connected to the split payment page through the link may select an item and process a payment and process for cost of the selected item.

According to an aspect of an example embodiment, there is provided a split payment method including: obtaining cost information of at least one transaction for a split payment; creating a split payment page that allows a visitor of the split payment page to pay a portion of a cost of the at least one transaction; providing the visitor with a link to the split payment page; and based on the portion of the cost of the at least one transaction being selected by the visitor of the split payment page, processing a payment or remittance of the portion of the cost, and updating the split payment page according to a result of the payment or the remittance.

The obtaining the cost information may include: capturing an image of a bill or a receipt of the at least one transaction; and recognizing the cost information of the at least one transaction from the captured image.

The creating the split payment page may include: creating the split payment page that shows a plurality of payment items of the at least one transaction, to allow the visitor of the split payment page to select one of the plurality of payment items to pay the portion of the cost of the at least one transaction.

The split payment page may include a first function of selecting the portion of the cost of the at least one transaction among a plurality of portions of the cost of the at least one transaction, and a second function of requesting the payment or remittance of the portion of the cost selected through the first function.

The split payment page may include a first area for displaying the cost information of each of a plurality of payment items of the at least one transaction, and a second area for displaying an amount to be paid or remitted by the visitor of the split payment pages, wherein the amount in the second area changes according to a selection of one or more of the plurality of payment items.

The processing of the payment or the remittance may include processing the payment of the portion of the cost in association with a seller or a service provider of the at least one transaction.

The processing of the payment or the remittance may include remitting the portion of the cost from the visitor of the split payment page to a seller, a service provider, or a payer of the at least one transaction.

The split payment method may further include: applying the result of the payment or the remittance of the visitor to the split payment page while the split payment page is opened by and shown to another visitor.

The split payment page may include a share function of sharing the result of the payment or the remittance of the visitor, and the split payment method may further include: forwarding the result of the payment or the remittance of the visitor to a user selected by the visitor from among a plurality of users having a personal relationship with the visitor in response to a share request from the visitor using the share function.

The forwarding the result of the payment or the remittance may include: based on the user selected by the visitor not being a settler of the split payment, forwarding the result of the payment or the remittance of the visitor to the user selected by the visitor in a state in which information about the visitor is removed or masked from the result of the payment or the remittance of the visitor.

The obtaining the cost information may include: receiving an image of a bill or a receipt of the at least one transaction that is captured using a camera of a terminal of a single settler among settlers of the split payment; recognizing text from the received image; and extracting the cost information of each of a plurality of payment items of the at least one transaction.

The processing the payment or the remittance may include: based on the visitor visiting the split payment page through the link is a last settler of the split payment, requesting the visitor to pay an entire remaining amount of the at least one transaction.

The split payment method may further include: providing an administrator page for requesting a settler of the split payment to divide the cost of the at least one transaction into a plurality of portions for the split payment.

According to an aspect of an example embodiment, there is provided a non-transitory computer-readable recording medium storing instructions that, when executed by at least one processor, cause the processor to perform the split payment method.

According to an aspect of an example embodiment, there is provided a computer system including: a memory configured to store computer-readable instructions; and at least one processor configured to execute the computer-readable instructions to: obtain cost information of at least one transaction for a split payment, create a split payment page that allows a visitor of the split payment page to pay a portion of a cost of the at least one transaction, provide the visitor a link to the split payment page, and based on the portion of the cost of the at least one transaction being selected by the visitor of the split payment page, process a payment or remittance of the portion of the cost, and updating the split payment page according to a result of the payment or the remittance.

The split payment page may include a first function of selecting the portion of the cost of the at least one transaction among a plurality of portions of the cost of the at least one transaction, and a second function of requesting the payment or remittance of the portion of the cost selected through the first function.

The at least one processor may be further configured to execute the computer-readable instructions to: process the payment of the portion of the cost in association with a seller or a service provider of the at least one transaction.

The at least one processor may be further configured to execute the computer-readable instructions to: process the remittance of the portion of the cost to remit the portion of the cost from the visitor of the split payment page to a seller, a service provider, or a payer of the at least one transaction.

The at least one processor may be further configured to execute the computer-readable instructions to: apply the result of the payment or the remittance of the visitor to the split payment page while the split payment page is opened by and shown to another visitor.

BRIEF DESCRIPTION OF THE FIGURES

The above and/or other aspects will be more apparent by describing certain example embodiments, with reference to the accompanying drawings, in which.

DETAILED DESCRIPTION

Figure 1:
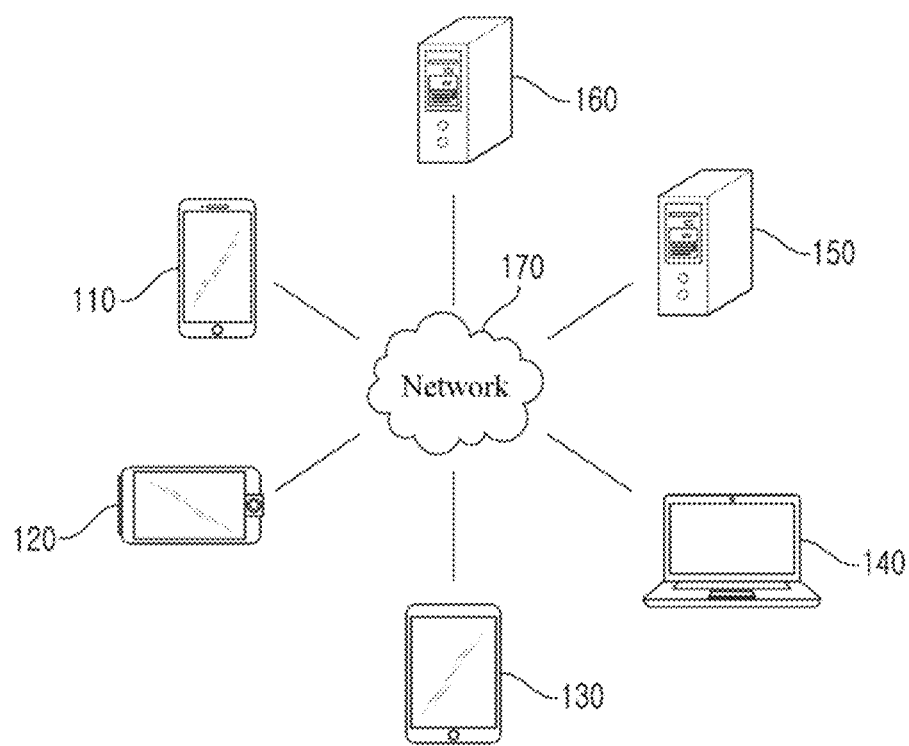
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments are described with reference to the accompanying drawings.

A split payment system according to example embodiments may be implemented by at least one computer apparatus, and a split payment method according to example embodiments may be performed through at least one computer apparatus included in the split payment system. Here, a computer program according to example embodiments may be installed and executed on the computer apparatus, and the computer apparatus may perform the split payment method under control of the executed computer program. The computer program may be stored in a computer-readable storage medium to execute the split payment method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided to describe one example among environments applicable to the example embodiments. An environment applicable to the example embodiments is not limited to the network environment of FIG. 1.

Each of the plurality of electronic devices 110, 120, 130, and 140 may be a stationary terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., a payment service, a group call service or an audio conferencing service, a messaging service, a mail service, a social network service, a map service, a translation service, a financial service, a search service, and a content providing service) to the plurality of electronic devices 110, 120, 130, and 140 connected over the network 170.

Figure 2:
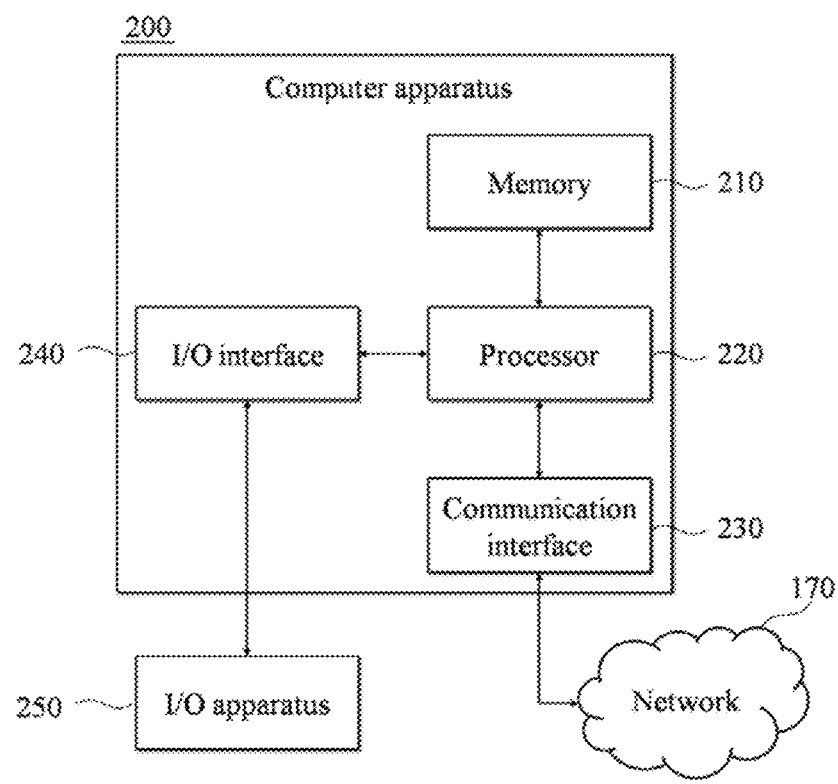
FIG. 2 is a diagram illustrating an example of a computer apparatus according to at least one example embodiment.

FIG. 2 is a block diagram illustrating an example of a computer apparatus according to at least one example embodiment. For example, each of the plurality of electronic devices 110, 120, 130, and 140 or each of the plurality of servers 150 and 160 may be implemented using a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access (RAM), read only memory (ROM), and a disc drive, as a non-transitory computer-readable storage medium. Here, the permanent mass storage device, such as ROM and disc drive, may be included in the computer apparatus 200 as a separate permanent storage device different from the memory 210. Also, an operating system (OS) and at least one program code may be stored in the memory 210. Such software components may be loaded from another non-transitory computer-readable storage medium to the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, the software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 220.

The communication interface 230 may provide a function of communication between the computer apparatus 200 and another apparatus, for example, the aforementioned storage devices, over the network 170. For example, the processor 220 of the computer apparatus 200 may transfer data, a file, a request or an instruction created based on the program code stored in the storage device, such as the memory 220, etc., to other apparatuses over the network 170 under control of the communication interface 230. The computer apparatus 200 may receive a signal, an instruction, data, a file, etc., from another apparatus through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interface with an I/O apparatus 250, including an input device and/or an output device. Examples of the input device may include a microphone, a keyboard, and a mouse, and examples of the output device may include a display device and a speaker. As another example, the I/O interface 240 may connect the computer apparatus 200 to the I/O apparatus 250 by providing an interface in which an input function and an output function are integrated into a single function, such as a touchscreen. The I/O apparatus 250 may be configured as a single apparatus with the computer apparatus 200.

According to other example embodiments, the computer apparatus 200 may include a number of components greater than or less than a number of components shown in FIG. 2. For example, the computer apparatus 200 may include at least a portion of the I/O apparatus 250, or may further include other components, for example, a transceiver, a database (DB), and the like.

Figure 3:
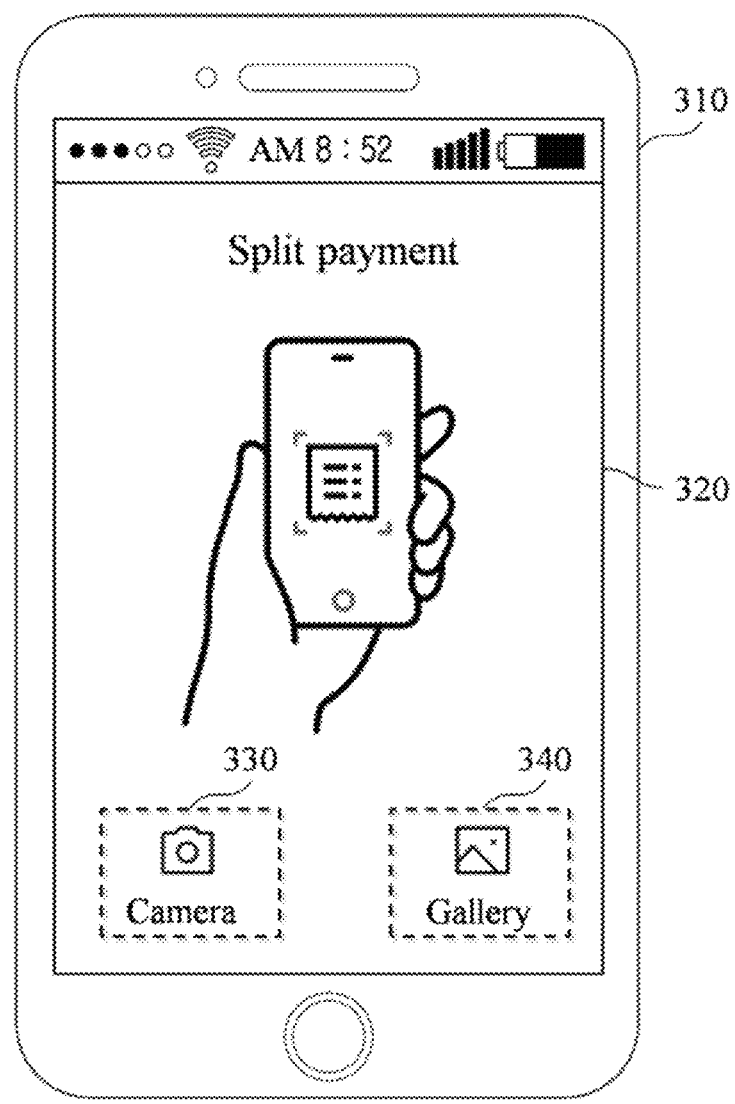
FIG. 3 illustrates an example of a receipt scanning process according to at least one example embodiment.

FIG. 3 illustrates an example of a receipt scanning process according to at least one example embodiment. FIG. 3 illustrates an example of a screen 320 of a user terminal 310 that is one of settlers of a split payment. To provide a split payment service, an application linked to the split payment service may be installed and executed on the corresponding user terminal 310. The screen 320 of FIG. 3 may refer to a service screen or a graphic user interface provided from the application. To proceed with the split payment, the user terminal 310 may request a user to provide information about a bill or a receipt of a transaction under control of the application. Here, referring to the screen 320 of FIG. 3, a first box (e.g., a camera icon) 330 indicated with dotted lines represents a user interface for activating a function of assisting the user to capture an image of a bill or a receipt using a camera and a second box (e.g., a gallery icon) 340 indicated with dotted lines represents a user interface for activating a function of assisting the user to select an image of a bill or a receipt captured and stored in the user terminal 310. For example, in response to a selection from the user on the user interface of the first box 330, for example, a touch of the user on an area of the first box 330 with a finger in a mobile environment, the user terminal 310 may activate the camera under control of the application and may acquire an image of the bill or the receipt captured through the executed camera.

In an example embodiment, the user terminal 310 may be provided with the split payment service through a server, for example, the server 150 of FIG. 1. In this case, the user terminal 310 may forward the captured image of the bill or receipt to the server and the server may create a recognition result by analyzing the image of the bill or the receipt and extracting texts. The server may provide a page including the recognition result to the user terminal 310.

Figure 4:
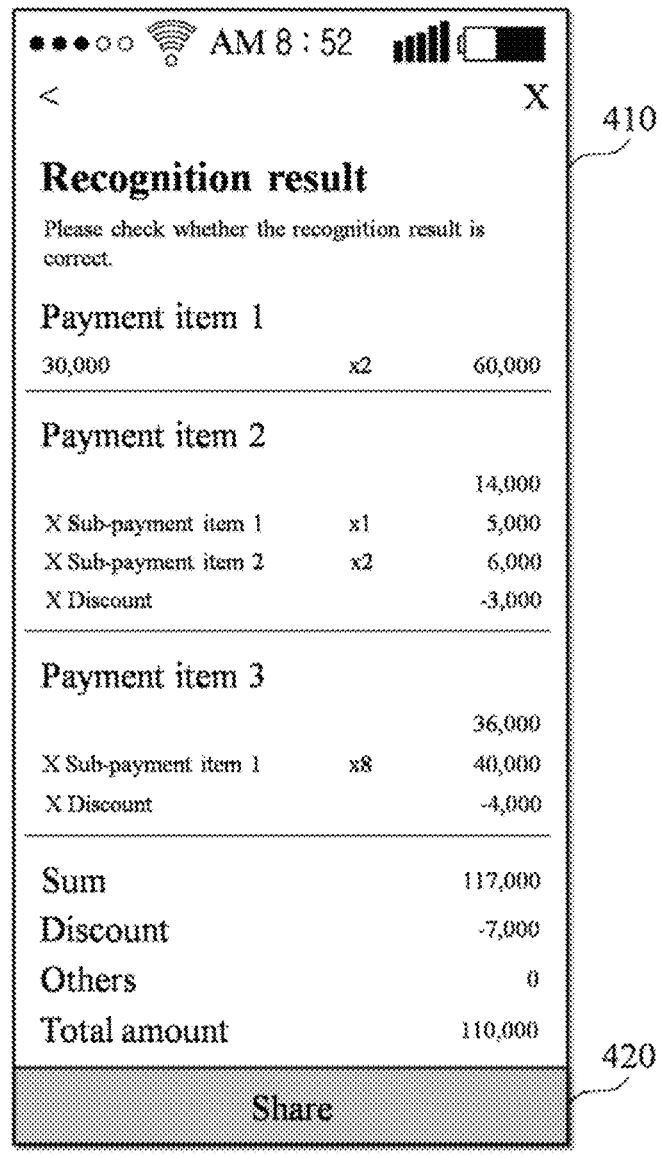
FIG. 4 illustrates an example of a receipt recognition result according to at least one example embodiment.

FIG. 4 illustrates an example of a receipt recognition result according to at least one example embodiment. FIG. 4 illustrates an example of a screen 410 on which a page including a receipt recognition result is displayed. Cost information for each payment item is displayed on the screen 410 and a user interface (e.g., a "share" button) 420 for activating a function of sharing the receipt recognition result with other users is also displayed on the screen 410. If the user selects the user interface 420, the receipt recognition result may be provided to the other users. Here, the user may directly select the other users to which the receipt recognition result is to be forwarded or a channel or media through which the receipt recognition result is to be displayed. For example, when the share button of the user interface 420 is pressed, the user terminal 310 may display a contact list that is stored in the user terminal 310, or provide a list of other users having a personal relationship with the user such that the user may directly select another user to which the receipt recognition result is to be provided. As another example, the user terminal 310 may provide the user with a list of specific services, for example, social network services, or chatrooms of an instant messenger capable of displaying the receipt recognition result such that the user may display the receipt recognition result for other users through a desired chatroom or service.

When a group of people participate in a service, an event, or a purchase of a product, a service provider or a seller may provide a single bill to a representative (e.g., the user of the user terminal 310) of the group of people, and the user terminal 310 may provide the user interface 420 to enable the representative to split the bill in various manners. For example, the computer apparatus 200 that is included in the user terminal 310 or in a server 150, 160 that communicates with the user terminal 310, may enable the user of the user terminal 310 to first pay the bill and split the bill between the representative and the rest of the participants in the group. In another example, the computer apparatus 200 may transmit the bill to each of the participants and may allow each of the participant to pay the service provider or seller their portion of the bill. When the share button of the user interface 420 is selected, the computer apparatus 200 may provide a plurality of splitting options, including splitting the entire bill evenly, splitting the bill according to an amount allocated to each participant in the group, and splitting the bill according to an amount settled by each participate in the group. The computer apparatus 200 may allow the user of the user terminal 310 to select one of the plurality of splitting options.

Herein, the term "split payment" may include dividing, that is, splitting and processing remittance for a payer after a payment is processed, in addition to splitting and processing the payment or the remittance in a state in which the payment is not processed. For example, although the receipt recognition result provided after processing a payment is described with reference to FIG. 4, the receipt recognition result may be provided by recognizing a receipt provided in a state in which the payment is not processed.

Here, the server may provide the selected other users with a link to the split payment page through the selected channel or the selected media. The split payment page may provide a result of recognizing a bill or a receipt and may simultaneously support settlers (or participants) of the split payment to perform a payment or remittance for the split payment for each payment item.

Figure 5:
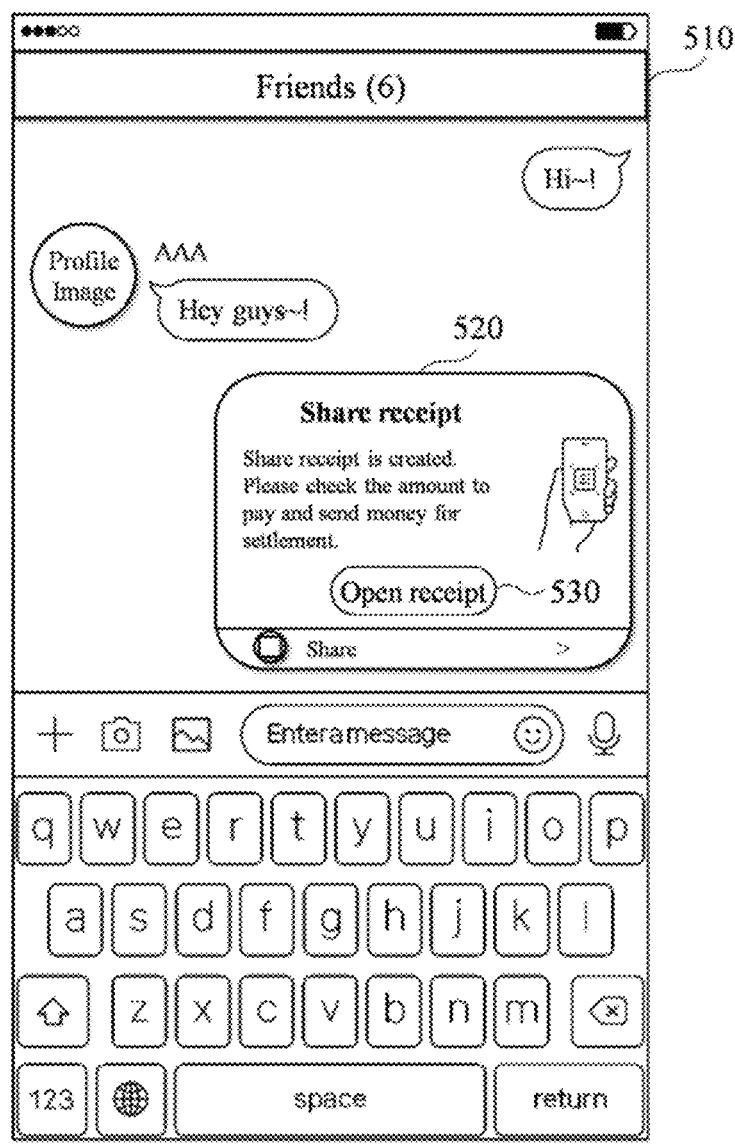
FIG. 5 illustrates an example of sharing a receipt according to at least one example embodiment.

FIG. 5 illustrates an example of sharing a receipt according to at least one example embodiment. A screen 510 of FIG. 5 illustrates an example of an instant messenger chatroom in which a user participates. In response to a selection from the user on a specific chatroom through the user interface 420 of FIG. 4, a link to share a receipt may be provided to a chatroom. Here, the link may include a link to the aforementioned split payment page. For example, a message 520 for informing that a shared receipt corresponding to the aforementioned split payment page is created may be displayed on the screen 510, and the message 520 may include a button 530 for opening the shared receipt. A link to the shared receipt may be set to the button 530. That is, in response to a selection on the button 530 from any user among users of the chatroom, the shared chatroom may be provided to the user. It may represent that any user to which a corresponding link is exposed as well as settlers of the split settlement may access the shared receipt.

Figure 6:
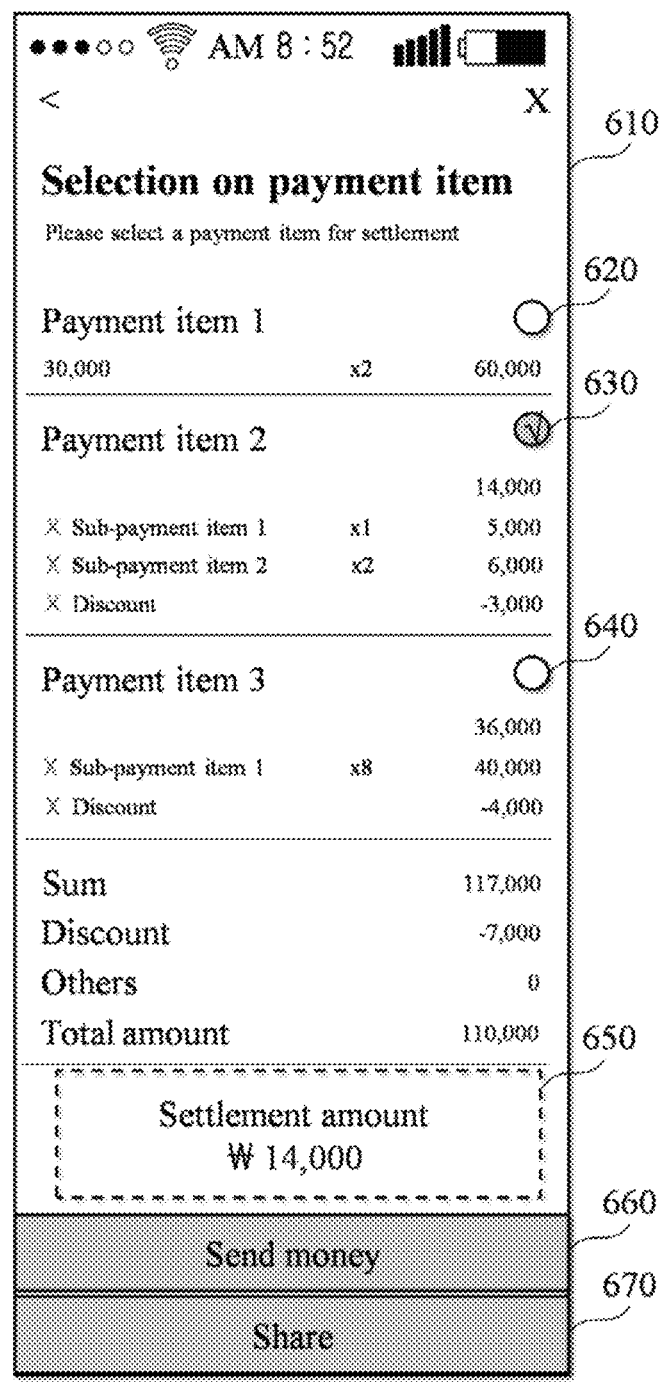
FIG. 6 illustrates an example of a split payment page according to at least one example embodiment.

FIG. 6 illustrates an example of a split payment page according to at least one example embodiment. FIG. 6 illustrates an example of a screen 610 that includes a split payment page. The split payment page may show a plurality of transactions (e.g., a plurality of transaction events) and/or a plurality of payment items of a single transaction (e.g., a single transaction event for which a group of participants are involved). In detail, FIG. 6 illustrates an example in which user interfaces 620, 630, and 640 capable of selecting payment items, respectively, are displayed on the screen 610 and a visitor of the split payment page selects the user interface 630 corresponding to a payment item 2. Here, for example, a first box 650 indicated with dotted lines represents an example of calculating and displaying a settlement amount corresponding to the selected payment item, for example, the payment item 2, in real time. If the visitor selects a payment item 1 and the payment 2, the settlement amount may be calculated as 74,000 won and displayed on an area of the first box 650. According to an example embodiment, the computer apparatus 200 may allow the visitor of the split payment page to pay a portion of the payment items 1, 2, and 3. For example, when the user interface 630 corresponding to the payment item 2 is selected, the computer apparatus 200 may display an input box to allow the visitor to enter an amount that the visitor agrees to pay for the payment item 2.

Meanwhile, a remittance button (a "send money" button) 660 may refer to a user interface for activating a function of supporting a user to remit a settlement amount. For example, in response to a selection from the visitor on the remittance button 660 on the screen 610, a function of remitting a settlement amount 14,000 won according to the payment item 2 selected by the user may be activated. Here, the payment or remittance may be processed through a financial service linked to the split payment service. Here, a target, that is, a recipient, of the remittance may be a seller or a payer corresponding to a bill or a receipt. That is, in a situation in which a payment is not completed, cost of a payment selected by a seller may be remitted or a payment may be processed by a payer and then cost of a subsequently selected payment item may be remitted to the payer.

Also, a share button 670 may refer to a user interface for activating a function that allows the user to share a bill or a receipt, for example, the receipt in the example embodiment of FIG. 6, provided through the split payment page with another user. For example, in response to a selection from the visitor on the share button 670, a function of selecting a target to share the receipt may be provided to the visitor and the receipt may be provided to the selected target to share with. Here, the selected target to share the receipt may be another user and may be a channel or media in which other users participate.

Although the example embodiment of the remittance is described with reference to FIG. 6, the payment may be processed in addition to the remittance. For example, assuming a case that a plurality of users eat together in a restaurant and then divide cost of food and processes a payment in the restaurant, a target or a seller of such remittance may be set by a sharer (or sender) of the bill or the receipt during a process of sharing the recognition result of FIG. 4. For example, the seller may be set as the target (or recipient) of the remittance or the payment through a method of selecting an official account of the seller. If a separate target is not set, a payer may be set as the target of the remittance.

If the visitor completes a settlement for a payment item of the visitor, information about the visitor processing the corresponding settlement may be displayed on the split payment page provided to other users in association with the settled payment item.

Figure 7:
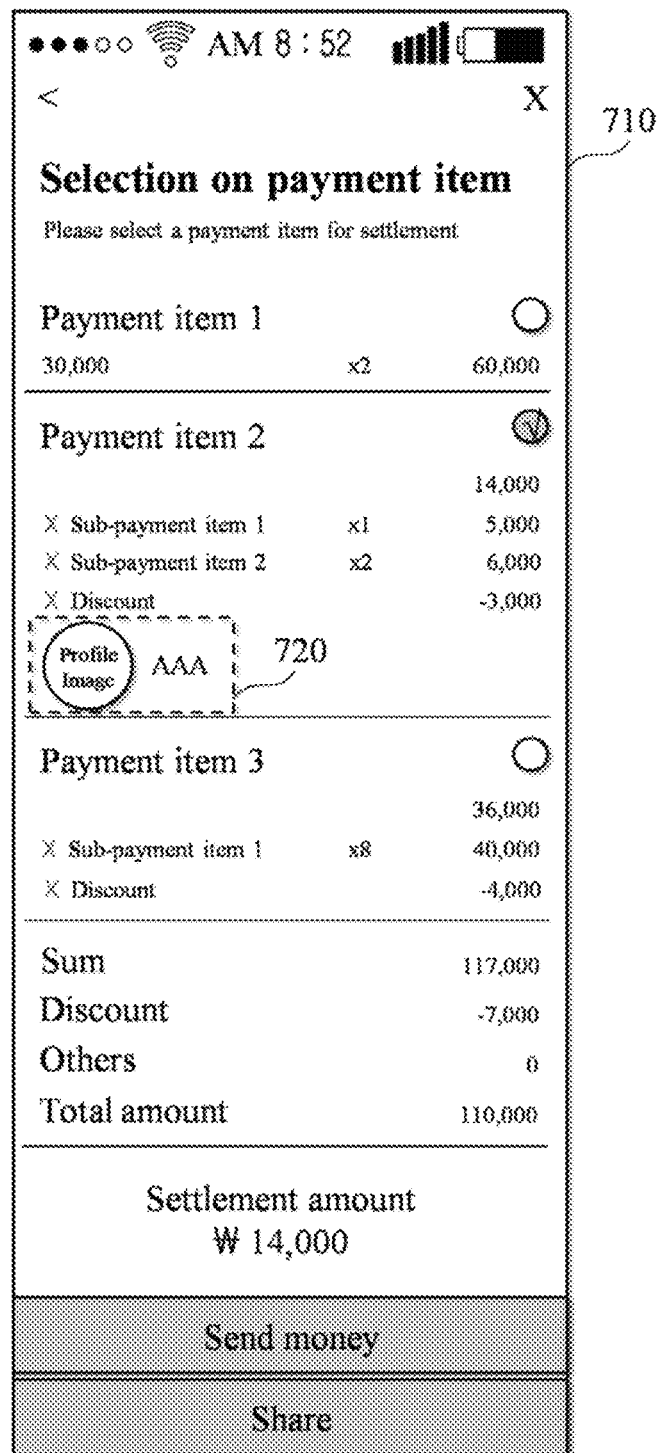
FIG. 7 illustrates an example of displaying information about a settler with respect to a payment item with which settlement is completed according to at least one example embodiment.

FIG. 7 illustrates an example of displaying information about a settler with respect to a payment item with which settlement is completed according to at least one example embodiment. FIG. 7 illustrates an example of a screen 710 displayed in a case in which a user identified by "AAA" visits a split payment page and completes a payment for a payment item 2 and then a user identified by "BBB" visits the split payment page. Here, if the user "BBB" is a settler of a split payment, information about the settler "AAA" may be displayed in association with the payment item 2 as shown in a first box 720 indicated with dotted lines.

If a user "CCC" aside from the settler of the split payment visits the corresponding split payment page, information about the settler "AAA" displayed as shown in the first box 720 may be removed or masked for protection of personal information. For example, information in which a profile image or a name of the settler "AAA" is masked may be displayed for the user "CCC".

Here, if the payment is divided, that is, split and thereby processed, a final settler may be requested to pay for the entire remaining amount for the split payment. That is, a payment on the field may be induced to proceed quickly by quickly completing a payment between a seller and settlers and then performing an additional settlement between subsequent settlers.

To this end, an administrator page for requesting another settler for a settlement may be provided to settlers. For example, a list of captured bills or receipts may be displayed on the administrator page and the user may select a specific bill or receipt on the administrator page. In this case, the selected bill or receipt may include a function that allows the user to select a specific payment item and settlement target and to request the selected settlement target to settle cost for the selected payment item. For example, in response to a request for settling cost using the function, the corresponding request may be forwarded to the settlement target through a server.

Figure 8:
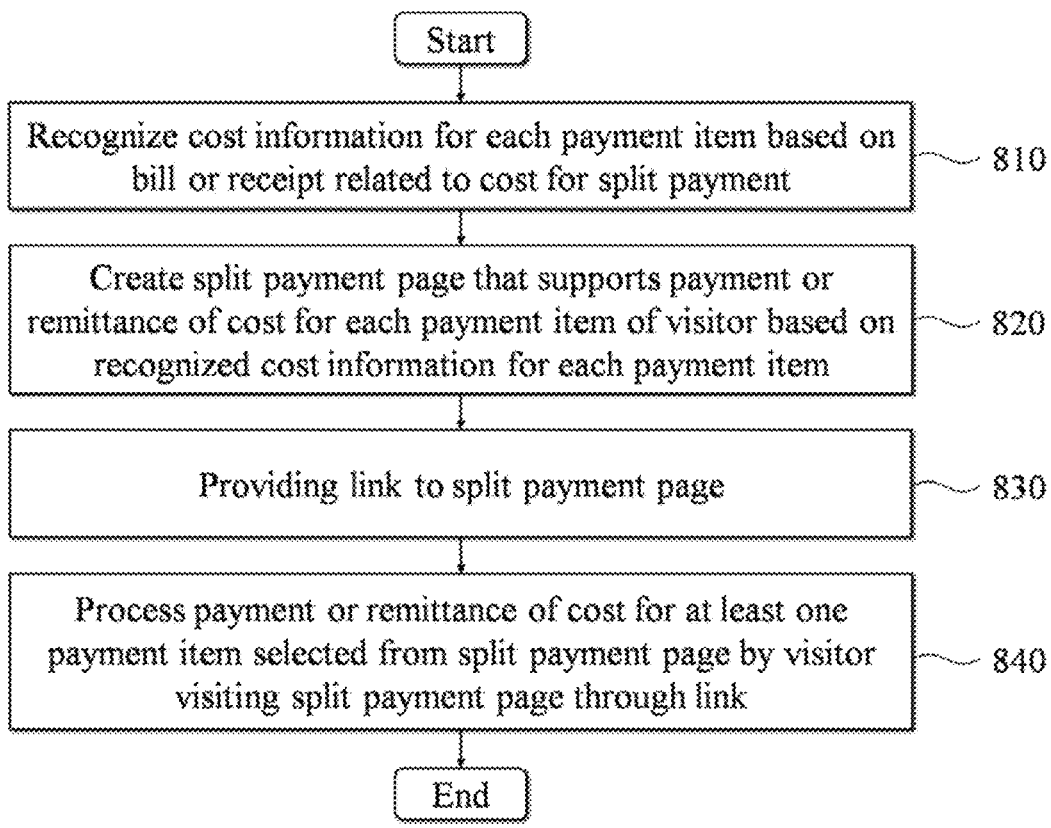
FIG. 8 is a flowchart illustrating an example of a split payment method according to at least one example embodiment.

FIG. 8 is a flowchart illustrating an example of a split payment method according to at least one example embodiment. The split payment method of FIG. 8 may be performed by the computer apparatus 200 that is included in a server or communicates with the server. Here, the processor 220 of the computer apparatus 200 may be configured to execute a control instruction according to a code of at least one computer program or a code of an OS included in the memory 210. Here, the processor 220 may control the computer apparatus 200 to perform operations 810 to 840 included in the split payment method of FIG. 8.

Referring to FIG. 8, in operation 810, the computer apparatus 200 may recognize cost information for each payment item based on a bill or a receipt related to cost for split payment. For example, if one of settlers of the split payment captures an image of the bill or the receipt using a user terminal of the corresponding settler and transmits the captured image to the computer apparatus 200, the computer apparatus 200 may analyze the received image and may recognize cost information for each payment item. In detail, for example, the computer apparatus 200 may receive an image of a bill or a receipt captured using a camera included in a terminal of one of the settlers of the split payment and may extract cost information for each payment item by recognizing a text from the received image.

In operation 820, the computer apparatus 200 may create a split payment page that supports a payment or remittance of cost for each payment item of a visitor based on the recognized cost information for each payment item. In an example embodiment, the split payment page may include a first function of selecting at least one payment item from among payment items and a second function of requesting a payment or remittance of cost for at least one payment item selected through the first function. In another example embodiment, the split payment page may include a first area for displaying the cost information for each payment item and, in response to a selection on at least one payment item, a second area for displaying cost for a payment or remittance dynamically calculated for the selected at least one payment item.

In operation 830, the computer apparatus 200 may provide a link to the split payment page. Since the settlers of the split payment process settlement, for example, a payment or remittance, of cost by sharing the link and autonomously accessing the split payment page, the computer apparatus 200 may not need to identify each of the settlers of the split payment and to individually attempt connection to each of the settlers. Therefore, the split payment may be quickly processed without a need to designate each of the settlers of the split payment at an initial stage of the split payment.

In operation 840, the computer apparatus 200 may process a payment or remittance of cost for at least one payment item selected from the split payment page by a visitor visiting the split payment page through the link. As described above with reference to the example embodiment of FIG. 6, if the visitor visits the split payment page, selects a payment item of the visitor on the split payment page, and requests remittance, the computer apparatus 200 may process only the remittance for cost of the selected payment item. As described above, a target of the remittance may be designated in advance and a settlement amount may be calculated in real time based on a selection of the payment item. Therefore, the computer apparatus 200 may quickly process the remittance to the designated target although the visitor does not separately input the target of the remittance or the settlement amount.

In detail, for example, in operation 840, the computer apparatus 200 may process the payment of cost for the selected at least one payment item in association with a seller corresponding to the bill or the receipt. In another example embodiment, in operation 840, the computer apparatus 200 may process the remittance of cost for the selected at least one payment item by using, as a recipient, a seller or a payer corresponding to the bill or the receipt.

In particular, the computer apparatus 200 may apply a result of the payment or the remittance of the visitor to the split payment page in association with the at least one payment item. That is, if a first visitor processes a payment or remittance for a payment item 1, information representing that settlement of the payment item 1 is completed may be provided to a second visitor. Likewise, if the second visitor processes a payment or a remittance for a payment item 2, information representing that settlement of the payment item 1 and the payment item 2 is completed may be provided to a third visitor. In an example embodiment, in a case where the link to the split payment page is provided to the first, the second, and third visitors, and the first visitor makes a payment while the second visitor and the third visitor open the split payment page using the link, the computer apparatus 200 may automatically update the split payment page provided to the second visitor and the third visitor to reflect a result of processing the payment of the first visitor.

Meanwhile, the split payment page may include a share function of sharing a result of the payment or the remittance of the visitor. In particular, the computer apparatus 200 may forward the result of the payment or the remittance of the visitor to a user selected by the visitor from among users having a personal relationship with the visitor in response to a share request from the visitor using the share function. In another example embodiment, the visitor may also select a channel or media, such as a chatroom or a social network service, instead of a user. In this case, the result of the payment or the remittance may be exposed through the corresponding channel or media and thereby forwarded to other users.

Here, if another user, for example, a user selected by the visitor, sharing the result of the payment or the remittance is not a settler of the split payment, the result of the payment or the remittance of the visitor may be shared with the other users in a state in which information about at least a portion of the visitor is removed or masked from the result of the payment or the remittance of the visitor.

Meanwhile, if the visitor visiting the split payment page through the link is a last settler of the split payment in processing the payment, the visitor may be requested to pay the entire remaining amount for the split payment. It may be used to further quickly process a payment on the field and then make additional settlement between settlers.

Also, the computer apparatus 200 may provide an administrator page for requesting a settler of the split payment for settlement for each payment item of the split payment. The administrator page may be used to process the aforementioned additional settlement or to request a settler having not completed settlement for the corresponding settlement.

As described above, according to some example embodiments, it is possible to recognize cost information for each payment item based on a bill or a receipt related to cost for split payment, and to create and provide a link to a split payment page that allows a selection on a payment item and supports a payment or remittance of cost for the selected payment item based on cost information for each payment item, such that each of users connected to the split payment page through the link may select an item and process a payment and process for cost of the selected item.

The systems or the apparatuses described herein may be implemented using hardware components, software components, and/or a combination thereof. For example, a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A split payment method comprising:
   when a split payment service application is launched, providing a graphic user interface (GUI) displaying a camera icon and a gallery icon,
   in response to the camera icon being selected, capturing an image of a bill or a receipt of at least one transaction for a split payment, and recognizing a plurality of payment items of the at least one transaction based on the captured image;
   in response to the gallery icon being selected, retrieving the image of the bill or the receipt of the at least one transaction from a memory, and recognizing the plurality of payment items based on the retrieved image;
   converting the image of the bill or the receipt including the plurality of payment items which are not individually selectable, into a split payment page including the plurality of payment items along with a plurality of checkboxes that allow a visitor of the split payment page to select a payment item, among the plurality of payment items, by checking off a corresponding one of the plurality of checkboxes;
   providing the visitor with a link to the split payment page by providing a chatroom of a messenger service in which the visitor participates with a message including the link;
   based on the payment item being selected from the plurality of payment items, and a payment button being selected by the visitor of the split payment page after the link is selected by the visitor, processing remittance of a portion of a cost of the at least one transaction corresponding to the selected payment item, and automatically updating the split payment page according to a result of the remittance.

2. The split payment method of claim 1, wherein the split payment page comprises a first function of selecting the portion of the cost of the at least one transaction among a plurality of portions of the cost of the at least one transaction, and a second function of requesting the payment or remittance of the portion of the cost selected through the first function.

3. The split payment method of claim 1, wherein the split payment page comprises a first area for displaying cost information of each of the plurality of payment items of the at least one transaction, and a second area for displaying an amount to be paid or remitted by the visitor of the split payment page, wherein the amount in the second area changes according to a selection of one or more of the plurality of payment items.

4. The split payment method of claim 1, wherein the processing of the payment or the remittance comprises processing the payment of the portion of the cost in association with a seller or a service provider of the at least one transaction.

5. The split payment method of claim 1, wherein the processing of the payment or the remittance comprises remitting the portion of the cost from the visitor of the split payment page to a seller, a service provider, or a payer of the at least one transaction.

6. The split payment method of claim 1, further comprising:
   applying the result of the payment or the remittance of the visitor to the split payment page while the split payment page is opened by and shown to another visitor.

7. The split payment method of claim 1, wherein the split payment page comprises a share function of sharing the result of the payment or the remittance of the visitor, and the split payment method further comprises:
   forwarding the result of the payment or the remittance of the visitor to a user selected by the visitor from among a plurality of users having a personal relationship with the visitor in response to a share request from the visitor using the share function.

8. The split payment method of claim 7, wherein the forwarding the result of the payment or the remittance comprises:
- based on the user selected by the visitor not being a settler of the split payment, forwarding the result of the payment or the remittance of the visitor to the user selected by the visitor in a state in which information about the visitor is removed or masked from the result of the payment or the remittance of the visitor.

9. The split payment method of claim 1, wherein the recognizing the plurality of payment items comprises:
- recognizing text from the retrieved image or the captured image; and
- extracting cost information of each of the plurality of payment items of the at least one transaction.

10. The split payment method of claim 1, wherein the processing the payment or the remittance comprises:
- based on the visitor visiting the split payment page through the link is a last settler of the split payment, requesting the visitor to pay an entire remaining amount of the at least one transaction.

11. The split payment method of claim 1, further comprising:
- providing an administrator page for requesting a settler of the split payment to divide the cost of the at least one transaction into a plurality of portions for the split payment.

12. A non-transitory computer-readable recording medium storing instructions that, when executed by at least one processor, cause the at least one processor to perform the split payment method of claim 1.

13. A computer system comprising:
- a memory configured to store computer-readable instructions; and
- at least one processor configured to execute the computer-readable instructions to:
  - when a split payment service application is launched, provide a graphic user interface (GUI) displaying a camera icon and a gallery icon,
  - in response to the camera icon being selected, capture an image of a bill or a receipt of at least one transaction for a split payment, and recognize a plurality of payment items of the at least one transaction based on the captured image;
  - in response to the gallery icon being selected, retrieve the image of the bill or the receipt of the at least one transaction from the memory, and obtain the plurality of payment items based on the retrieved image;
  - convert the image of the bill or the receipt including the plurality of payment items which are not individually selectable, into a split payment page including the plurality of payment items along with a plurality of checkboxes that allow a visitor of the split payment page to select a payment item, among the plurality of payment items, by checking off a corresponding one of the plurality of checkboxes,
  - provide the visitor a link to the split payment page by providing a chatroom of a messenger service in which the visitor participates with a message including the link,
  - based on the payment item being selected from the plurality of payment items, and a payment button being selected by the visitor of the split payment page after the link is selected by the visitor, process remittance of a portion of a cost of the at least one transaction corresponding to the selected payment item, and automatically updating the split payment page according to a result of the remittance.

14. The computer system of claim 13, wherein the split payment page comprises a first function of selecting the portion of the cost of the at least one transaction among a plurality of portions of the cost of the at least one transaction, and a second function of requesting the payment or remittance of the portion of the cost selected through the first function.

15. The computer system of claim 13, wherein the at least one processor is further configured to execute the computer-readable instructions to:
- process the payment of the portion of the cost in association with a seller or a service provider of the at least one transaction.

16. The computer system of claim 13, wherein the at least one processor is further configured to execute the computer-readable instructions to:
- process the remittance of the portion of the cost to remit the portion of the cost from the visitor of the split payment page to a seller, a service provider, or a payer of the at least one transaction.

17. The computer system of claim 13, wherein the at least one processor is further configured to execute the computer-readable instructions to:
- apply the result of the payment or the remittance of the visitor to the split payment page while the split payment page is opened by and shown to another visitor.

* * * * *